US007529956B2

(12) United States Patent
Stufflebeam

(10) Patent No.: US 7,529,956 B2
(45) Date of Patent: May 5, 2009

(54) GRANULAR REDUCTION IN POWER CONSUMPTION

(75) Inventor: Kenneth W Stufflebeam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 11/488,306

(22) Filed: Jul. 17, 2006

(65) Prior Publication Data

US 2008/0016380 A1 Jan. 17, 2008

(51) Int. Cl.
G06F 1/32 (2006.01)
(52) U.S. Cl. .................................. 713/320; 713/502
(58) Field of Classification Search ................. 713/300, 713/310, 320, 322, 323, 324, 502
See application file for complete search history.

(56) References Cited

U.S. PATENT DOCUMENTS

| | | | |
|---|---|---|---|
| 5,590,342 A | 12/1996 | Marisetty | |
| 5,675,814 A | 10/1997 | Pearce | |
| 5,754,869 A | 5/1998 | Holzhammer et al. | |
| 6,000,035 A | 12/1999 | Matsushima et al. | |
| 6,161,187 A | 12/2000 | Mason et al. | |
| 6,357,013 B1 | 3/2002 | Kelly et al. | |
| 7,000,140 B2 | 2/2006 | Okubo et al. | |
| 7,149,915 B2 * | 12/2006 | Matsuoka et al. | 713/502 |
| 2002/0026601 A1 | 2/2002 | Shiraga et al. | |
| 2003/0154347 A1 | 8/2003 | Ma et al. | |
| 2004/0059954 A1 * | 3/2004 | Hoehler | 713/300 |
| 2005/0210312 A1 | 9/2005 | Maruichi et al. | |
| 2007/0050653 A1 * | 3/2007 | Verdun | 713/320 |

FOREIGN PATENT DOCUMENTS

EP 0 458 756 A1 11/1991

OTHER PUBLICATIONS

"Decrease Processor Power Consumption Using a CoolRunner CPLD," May 16, 2001, XILINX, <http://www.xilinx.com/bvdocs/appnotes/xapp347.pdf.
Lorch, J.R., and A.J. Smith, "Reducing Processor Power Consumption by Improving Processor Time Management in a Single-User Operating System," *Proceedings of the Second Annual Int'l Conference on Mobile Computing and Networking*, Rye, New York, Nov. 1996, pp. 143-154.
Maro, R., et al., "Dynamically Reconfiguring Processor Resources to Reduce Power Consumption in High-Performance Processors," *Lecture Notes in Computer Science*, vol. 2008, 2000.

* cited by examiner

*Primary Examiner*—Dennis M Butler
(74) *Attorney, Agent, or Firm*—Wolf Greenfield & Sacks, P.C.

(57) ABSTRACT

Generally described, embodiments of the present invention are directed at reducing the power consumed by a CPU. In accordance with one embodiment, a method is provided that transitions the CPU into a reduced power state in response to a fetch operation being dispatched to an I/O device. More specifically, the method includes comparing the latency associated with recovering from a reduced power state with the time remaining before a timer expires. Then, a signal is generated that identifies a timer-specific reduced power state. The method aggregates signals received from different timers to identify a reduced power that is appropriate given all of the processing that is scheduled to be performed.

20 Claims, 5 Drawing Sheets

GRANULAR REDUCTION IN POWER CONSUMPTION

BACKGROUND

Market requirements, environmental needs, business costs, and limited battery life dictate that computing devices use as little energy as possible while still providing robust computing services. The energy consumed by a computing device can be more efficiently managed by providing enough computational power for each service as needed instead of providing maximum computational power at all times. Computing devices, such as laptop, desktop, and mainframe computers, set-top boxes, entertainment and gaming systems, personal digital assistants (PDAs), cellular telephones, etc., provide services by causing program instructions to be executed by electronic circuitry. The electronic circuitry that executes computer program instructions in a computing device is often contained in a single integrated circuit referred to as a "core." A core may be contained in a single physical package often referred to as a "central processing unit" (CPU). Those skilled in the art and others will recognize that multiple interacting cores may be contained in a CPU and that computers may have more than one CPU available to execute instructions.

Those skilled in the art and others will recognize that the CPU serves as the computational center of the computer by supporting the execution of program instructions. In this regard, the CPU follows a fetch and execute cycle in which instructions implemented by a program are sequentially "fetched" from an input/output ("I/O") device via a bus. Then, to execute a fetched instruction, a sequence of control signals is transmitted to the relevant units of the CPU to perform the actions as directed by the instruction.

Numerous techniques have been introduced to reduce power consumption within a processing architecture that uses one or more CPUs. For example, in some systems, when a predetermined amount of idleness is identified, functionality is provided that enables the CPU to transition into one of several available reduced power states. Transitioning the CPU into reduced power state may include, reducing the voltage and/or clock speed of the CPU, disabling CPU subsystems, and the like. Each successively deeper reduced power state provides greater levels of power savings but is also associated with a greater latency. Stated differently, the deeper the reduced power state a CPU enters, the greater the time period ("latency") before the CPU is able to return to a working state.

There is an increasing performance gap between CPUs and I/O systems that has resulted in larger numbers of idle CPU cycles between fetch operations. For example, processor speeds have traditionally doubled every 18-24 months without a matching increase in the performance for I/O devices. As a result, when a CPU requests a memory fetch for data stored on an I/O device, the CPU will usually have idle CPU cycles until request can be satisfied. While existing systems quantify the idleness of a computer over a given period of time to determine whether a CPU should transition into a reduced power state, additional power savings may be achieved with a granular power reduction scheme in which a CPU is able to transition into a reduced power state while waiting for an operation to be satisfied.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, embodiments of the present invention are directed at reducing the power consumed by a CPU. In accordance with one embodiment, a method is provided that transitions the CPU into a reduced power state in response to a fetch operation being dispatched to an I/O device. More specifically, the method includes comparing the latency associated with recovering from a reduced power state with the time remaining before a timer expires. Then, a signal is generated that identifies a timer-specific reduced power state. The method aggregates signals received from different timers to identify a reduced power that is appropriate given all of the processing that is scheduled to be performed. As a result, the CPU may be transitioned into a reduced power state at a time when the CPU would normally be idle without negatively impacting the performance of the computer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
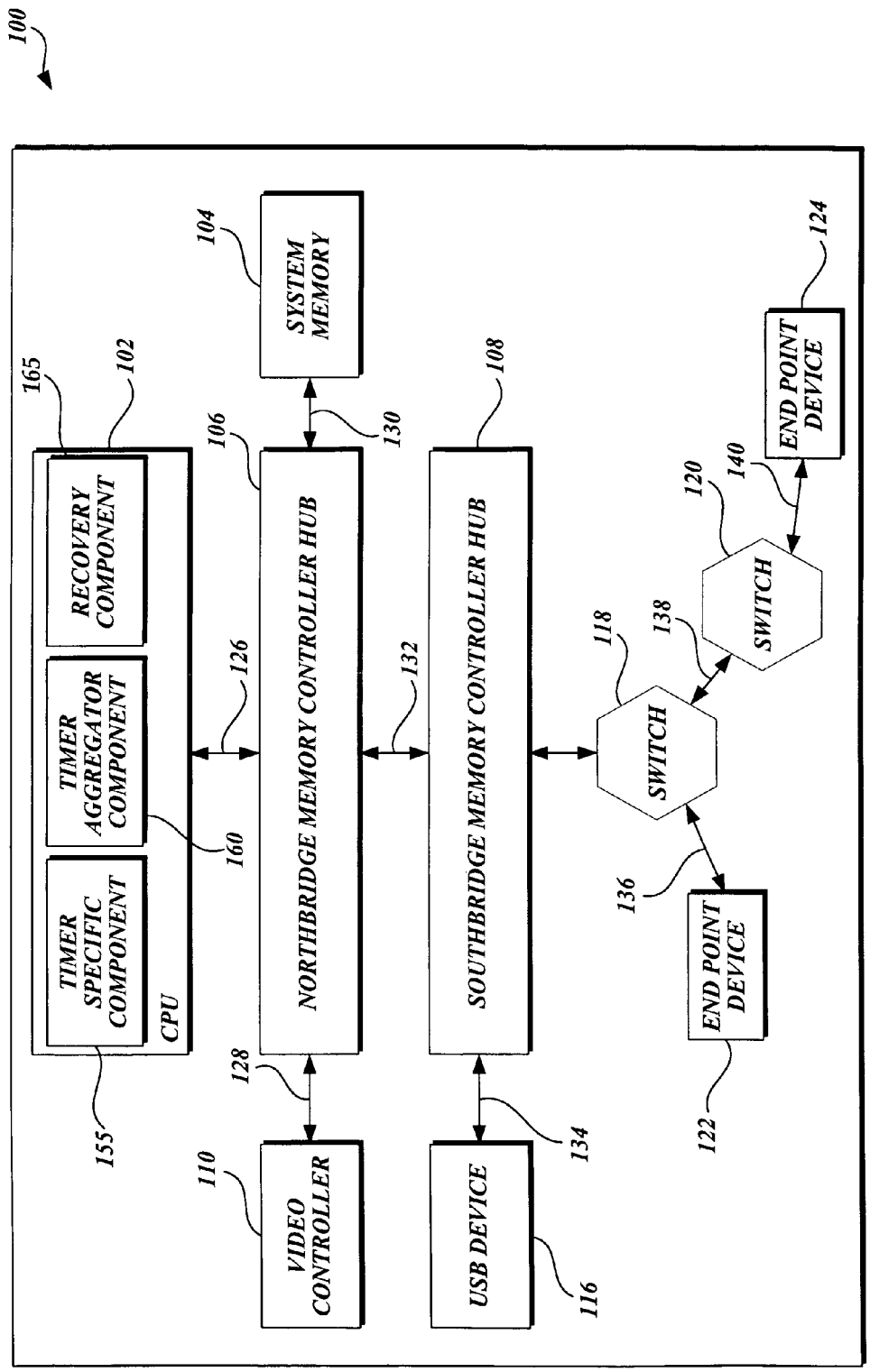
FIG. 1, is an exemplary block diagram of a computer suitable to illustrate aspects of the present invention.

While the present invention will primarily be described in the context of reducing the power consumed by a CPU, those skilled in the relevant art and others will recognize that the present invention is also applicable in other contexts. In any event, the following description first provides a general overview of a computer in which aspects of the present invention may be implemented. Then logic for performing the invention in accordance with one embodiment is described. The illustrative examples described herein are not intended to be exhaustive or to limit the invention to the precise forms disclosed. Similarly, any steps described herein may be interchangeable with other steps or combinations of steps in order to achieve the same result.

Now with reference to FIG. 1, an exemplary hardware platform of a computer 100 suitable to illustrate aspects of the present invention will be described. Those skilled in the art and others will recognize that the computer 100 depicted in FIG. 1 may be any one of a variety of devices including, but not limited to, personal computing devices, server-based computing devices, mini- and mainframe computers, laptops, personal digital assistants ("PDAs"), or other electronic devices having some type of memory. For ease of illustration and because it is not important for an understanding of the present invention, FIG. 1 does not show the typical components of many computers, such as a keyboard, a mouse, a printer, a display, etc. However, in the embodiment illustrated in FIG. 1, the hardware platform on the computer 100 includes a CPU 102, a system memory 104, the northbridge memory controller hub 106, the southbridge I/O controller hub 108, the video controller 110, the USB device 116, the switches 118 and 120, and the endpoint devices 122 and 124. As further illustrated in FIG. 1, components on the hardware platform are communicatively connected via the buses 126-140.

As illustrated in FIG. 1, the host computer 100 includes a Northbridge memory controller hub 106 and a Southbridge I/O controller hub 108. Typically, these types of controllers are integrated into what is commonly known as a "chipset" of a computer. On one hand, the Northbridge memory controller hub 106 manages input/output ("I/O") between the CPU 102 and components that are directly connected to the Northbridge memory controller hub 106, such as the video controller 110, system memory 104, and the like. In this regard, the Northbridge memory controller hub 106 may enable the use of devices that adhere to any number of different communication protocols, such as, but not limited to, Advanced Graphic Port ("AGP"), Peripheral Component Interconnect-express ("PCI-X"), and the like. On the other hand, the Northbridge memory controller hub 106 also manages communications routed through the Southbridge I/O controller hub 108, which typically enables the use of "slower" devices that are capable of being a communication link removed from the CPU 102. In this regard, the Southbridge I/O controller hub 108 may enable the use of devices that adhere to any number of different communication protocols, such as, but not limited to Universal Serial Bus ("USB"), FireWire (also known as "IEEE 1394" or "iLink"), Integrated Drive Electronics ("IDE"), and the like.

As mentioned previously, to execute programs the CPU 102 follows a fetch and execute cycle in which instructions are sequentially "fetched" from an I/O device, such as the system memory 104, the USB device 116, or the endpoint devices 122 and 124. The time period in which a fetch operation is satisfied depends on the communication path between the device that stores the desired data and the CPU 102. For example, if data that is the object of a fetch operation is stored in system memory 104, a fetch request may be made in the time required for the request to be communicated from (1) the CPU 102 to the Northbridge memory controller hub 106 (e.g., 10 clock cycles), (2) through the management logic implemented by the Northbridge memory controller hub 106 (e.g., 20 clock cycles), and (3) finally to the system memory 104 over the bus 130 (e.g., 10 clock cycles). In this example, the request may be transmitted to the system memory 104 in forty (40) clock cycles and the requested data available to the CPU 102 in a total of eighty (80) clock cycles.

By way of another example, if data that is the object of a fetch operation is stored on the USB device 116, a fetch request may be issued in the time required for the request to be communicated (1) from the CPU 102 to the Northbridge memory controller hub 106 (e.g., 10 clock cycles), (2) through the management logic implemented by the Northbridge memory controller hub 106 (e.g., 20 clock cycles), (3) from the Northbridge memory controller hub 106 to the Southbridge I/O controller hub 108 (10 clock cycles), (4) through the management logic implemented by the Southbridge I/O controller hub 106 (e.g., 20 clock cycles), and (5) and finally to the USB device 116 over the bus 134 (e.g., 10 clock cycles). In this example, the request may be transmitted to the USB device 116 in seventy (70) clock cycles with the requested data being available to the CPU 102 in a total of one hundred and forty (140) clock cycles. Moreover, if data that is the object of a fetch operation is stored on either of the endpoint devices 122 or 124, additional time is required as a result of the request being routed through the switch 118 and/or the switch 120.

As mentioned previously, when the CPU 102 requests a memory fetch for data stored on an I/O device, the CPU 102 will usually have idle cycles until the request can be satisfied. With traditional systems, the decision-making on when to place the CPU 102 or other component of the computer 100 into a reduced power state may be based on a high-level assessment that quantifies the amount of idleness a computer is experiencing over a given period of time. Logic implemented by the present invention uses a more granular scheme for reducing the power consumed by a computer. More specifically, in accordance with one embodiment, aspects of the present invention may place the CPU 102 into a reduced power state between fetch operations. As a result, during cycles in which the CPU 102 was traditionally consuming a maximum amount of power without executing instructions, the CPU 102 is placed into a reduced power state. The reduced power state in which the CPU enters depends on the length of time that the fetch operation may be satisfied.

In one exemplary embodiment, functionality of the present invention is implemented on a hardware device, such as the CPU 102. In this regard and as depicted in FIG. 1, the CPU 102 includes a plurality of components with logic that implement various aspects of the present invention including a timer specific component 155, a timer aggregator component 160, and a recovery component 165. Those skilled in the art and others will recognize that CPUs typically contain other components than those depicted in FIG. 1, such as an arithmetic logic unit ("ALU"), control unit ("CU"), and the like. However, since these components are not necessary for an understanding of the present invention, they are will not be described here.

Figure 2:
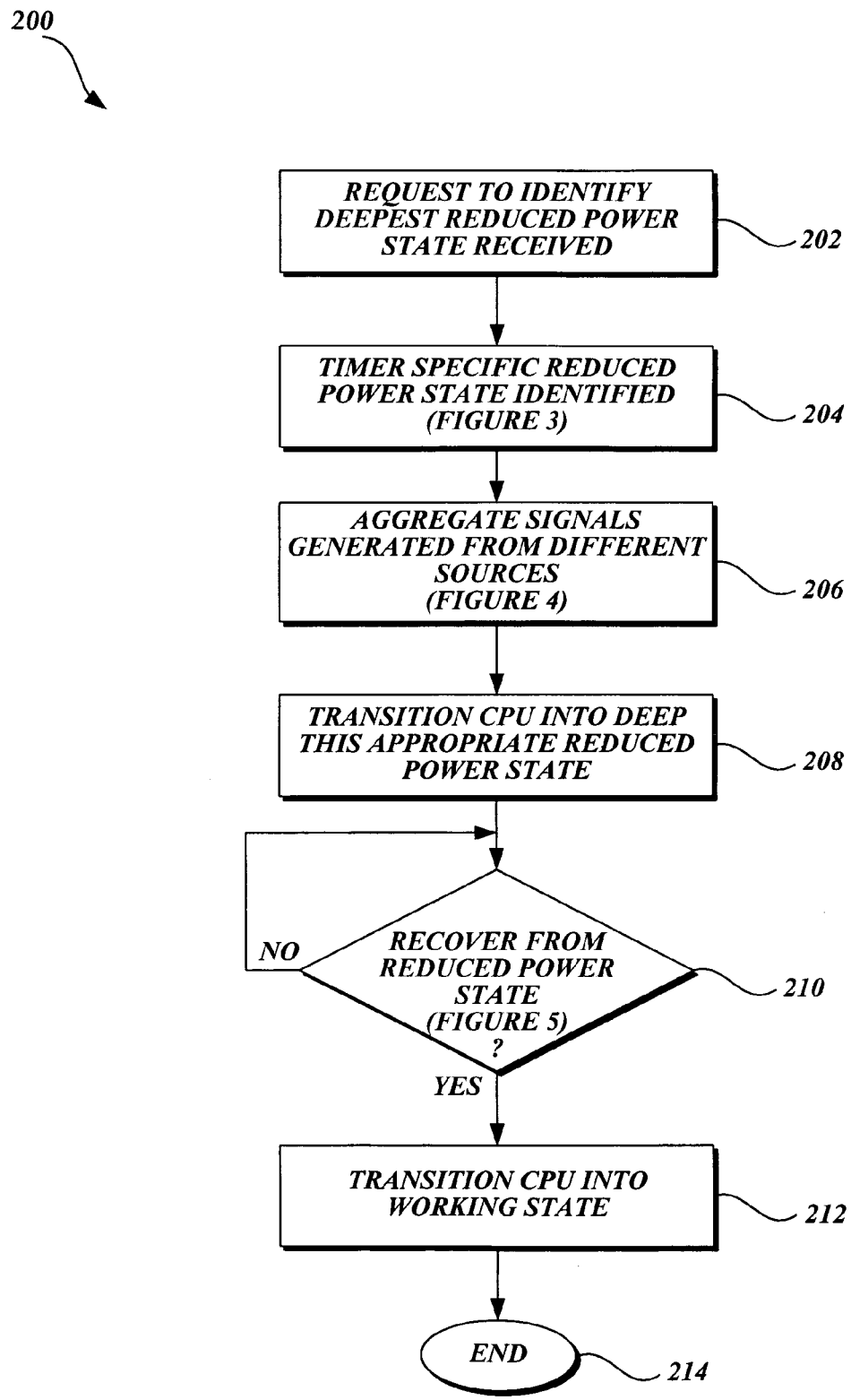
FIG. 2 is a functional flow diagram of an exemplary method for reducing the power consumed by a CPU in accordance with one embodiment of the present invention.

Now with reference to FIG. 2 an exemplary method 200 that reduces the power consumed by a CPU when compared to traditional systems will be described. As illustrated in FIG. 2, the method 200 begins at block 202 where a request directed at identifying the deepest acceptable reduced power state that will not negatively impact system performance is received. In accordance with one embodiment, the request is generated in response to a fetch operation being dispatched from a CPU to an I/O device. However, while the method 200 is described as being performed in response to a fetch operation being dispatched, those skilled in the art and others will recognize aspects of the present invention may be applied in different circumstances without the departing from the scope of the claimed subject matter.

At block 204, a plurality of signals are generated that each identify an appropriate timer-specific reduced power state for the CPU. Generally stated and in accordance with one embodiment, aspects of the present invention determine whether power savings may be achieved when a CPU is waiting for a fetch operation to be satisfied. In this regard, computers typically have multiple timers, implemented either in software or hardware that, upon expiration cause a CPU to execute instructions. As described in further detail below with reference to FIG. 3, the signals generated at block 204 enable a transition into an appropriate reduced power state based on when a timer is scheduled to cause the CPU to perform processing.

As mentioned previously, a certain amount of latency is associated with transitioning between a reduced power state as components of the CPU require time to complete the power state transition. Moreover, those skilled in the art in others will recognize that deeper reduced power states which achieve greater amounts of power savings are also associated with a greater latency. For example, some existing systems implement reduced power states commonly known as "C-states." In this example, a linear promotion and demotion scheme is typically implemented in which a CPU consumes the most amount of power in the working state ("C0"). When idleness is detected, the CPU may transition from the working state into an initial reduced power state ("C1"). Also, when appropriate, the CPU may be transitioned into deeper reduced power states ("C2-C4") each of which is associated with successively larger amounts of power savings and latency. In some systems, additional power savings is achieved with more granular reduced power states commonly known as "P-states." In these systems, within a particular C-state, the CPU may transition between more narrowly defined P-states. Aspects of the present invention may cause a CPU to transition into reduced power C-states and/or P-states. However, it is also contemplated that the present invention may use any other existing, or yet to be developed system that supports reduced power states. Thus, the examples of reduced power C-states and P-states should be construed as exemplary and not limiting.

Transitioning into a reduced power state between fetch operations may not always be appropriate. For example, with the advance in computer technology it is plausible that the latency associated with transitioning from a reduced power state could be greater than the time required to satisfy a fetch operation. In this instance, placing the CPU into the reduced power state while the CPU is waiting for a fetch operation to be satisfied would adversely affect system performance. Similarly, transitioning the CPU into a deeper reduced power state than is appropriate given the time remaining before the CPU is scheduled to perform processing would also negatively impact system performance. Thus, as described in further detail below, logic implemented by the present invention identifies a deepest reduced power state for the CPU. In this regard, the deepest reduced power state is identified by comparing the time required to satisfy a particular fetch operation with the latency of placing the CPU into a reduced power state.

Now with reference to FIG. 3, a timer specific component 155 of the present invention mentioned briefly above with reference to FIG. 1 will be described in more detail. As mentioned previously, at block 204, a plurality of signals are generated that originate from different timers. In one embodiment, the timer specific component 155 is responsible for generating a signal for each timer that is capable generating events, which require CPU attention. In accordance with one embodiment and as illustrated in FIG. 3, the exemplary timer specific component 155 includes an incoming request signal 300, discrete elements of comparator logic 302-308, a set of inverters 310-314, a set of preliminary "AND" comparators 316-320, and a set of terminating "AND" comparators 322-328.

Those skilled in the art in others will recognize that comparators are electronic devices which compare inputs to produce an output that characterizes a similarity or difference between the inputs. In this regard, each discrete element of comparator logic 302-308 illustrated in FIG. 3 performs a comparison of the time remaining before a timer expires with the recovery time associated with returning from a particular reduced power state. For example, in the example illustrated in FIG. 3, the discrete element of comparator logic 302 compares the recovery time of returning from the C4 reduced power state with the time remaining before the timer expires. If the time remaining before expiration is greater than the recovery time of returning from the C4 reduced power state, the output produced by the comparator logic 302 is "true." As illustrated in FIG. 3, this output from the comparator logic 302 is input into the inverter 310 and terminating "AND" comparator 322. In a similar fashion, the discrete elements of comparator logic 304-308 each compare the recovery time of returning from a particular reduced power state (e.g., C0-C3) with the time remaining before the timer expires.

Figure 3:
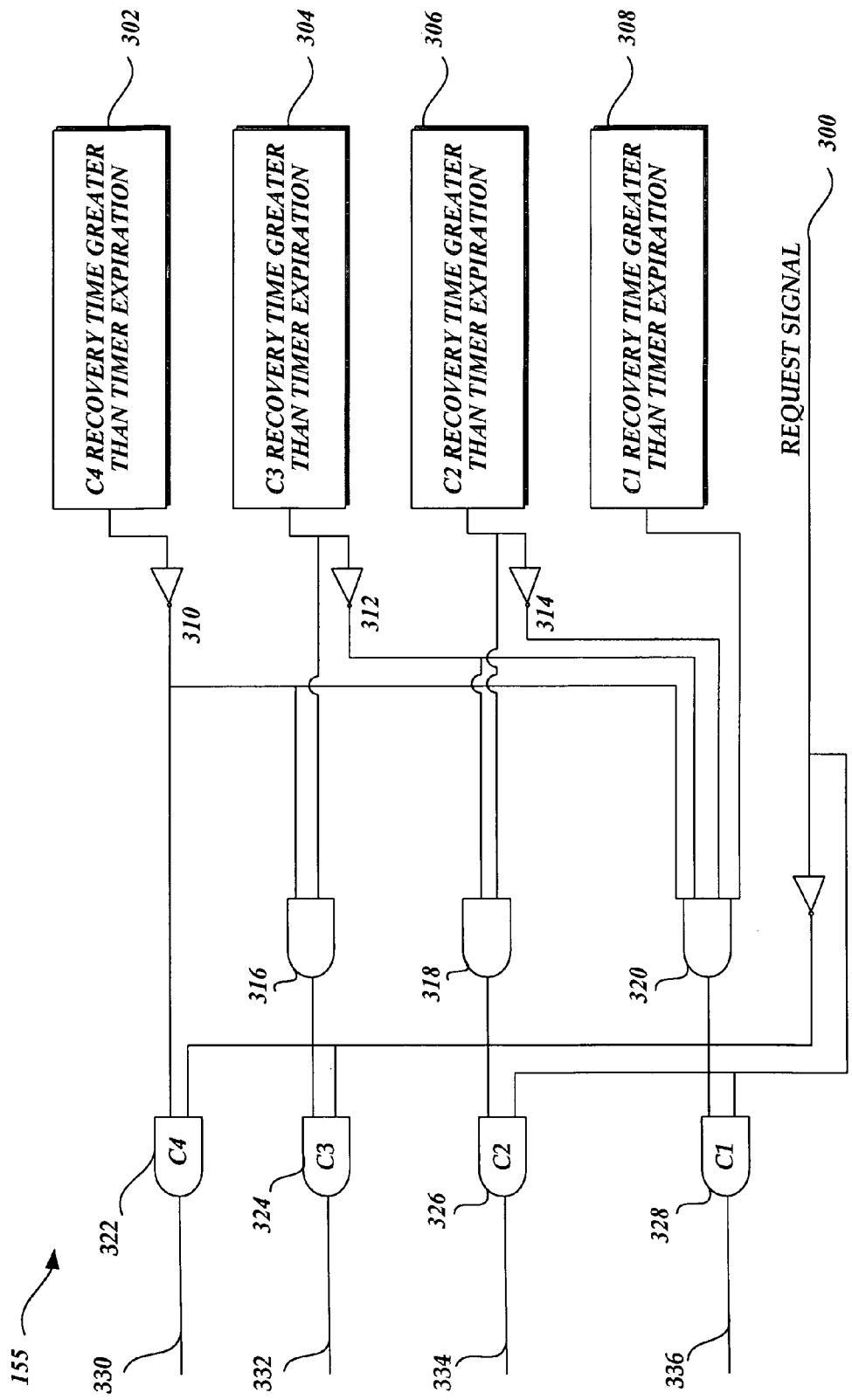
FIG. 3 is a block diagram of exemplary design logic for identifying a reduced power state appropriate for a particular timer in accordance with one embodiment of the present invention.

The design logic implemented by the discrete elements of comparator logic 302-308, the set of inverters 310-314, and the set of preliminary "AND" comparators 316-320 illustrated in FIG. 3 may generate multiple "true" signals for the terminating "AND" comparators 322-328. Which terminating "AND" comparator receive a "true" signal depends on the time remaining before timer expiration when compared to the time required to recover from a particular reduced power state. In this regard and by way of example only, if the time remaining before timer expiration is greater than the recovery time associated with returning from the C3 reduced power state but less than the time associated with returning from the C4 reduced power state, the terminating "AND" comparators 324-328 will receive a "true" signal. Alternatively, if the time remaining before timer expiration is greater than the recovery time associated with returning from the C2 reduced power state, the terminating "AND" comparators 318 and 320 will receive a "true" signal. Similarly, other "AND" comparators may receive a "true" signal, if time remaining before timer expiration is within the appropriate range.

In accordance with one embodiment, two signals are input into each of the terminating "AND" comparators 322-328. As described previously, one of the signals originates from design logic that identifies appropriate reduced power states given the amount time before a timer will expire. As illustrated in FIG. 3, the second input of the terminating "AND" comparators 322-328 is the incoming request signal 300. In this regard and as mentioned previously, a "true" value may be generated on the incoming request signal 300 any time the CPU experiences idleness. For example, a component of a CPU may generate a request to identify the deepest appropriate reduced power state on the incoming request signal 300 in response to a fetch operation. In this instance, one of the output signals 330-336 may enable a transition into that state. As described in further detail below, the output signals 330-336 may be used by the timer aggregator component 160 to identify a reduced power state for the CPU given all of the processing that is scheduled to be performed.

Returning now to FIG. 2, once the timer specific component 155 generates output, signals that originate from a plurality of sources including one or more timers are aggregated at block 206. By aggregating the various signals, aspects of present invention may enable the CPU to transition into the most appropriate reduced power state in a way that does not negatively impact system performance. More specifically, logic implemented in the timer aggregator component 160 allows the CPU to transition into the deepest reduced power state given the processing that is scheduled to performed.

Figure 4:
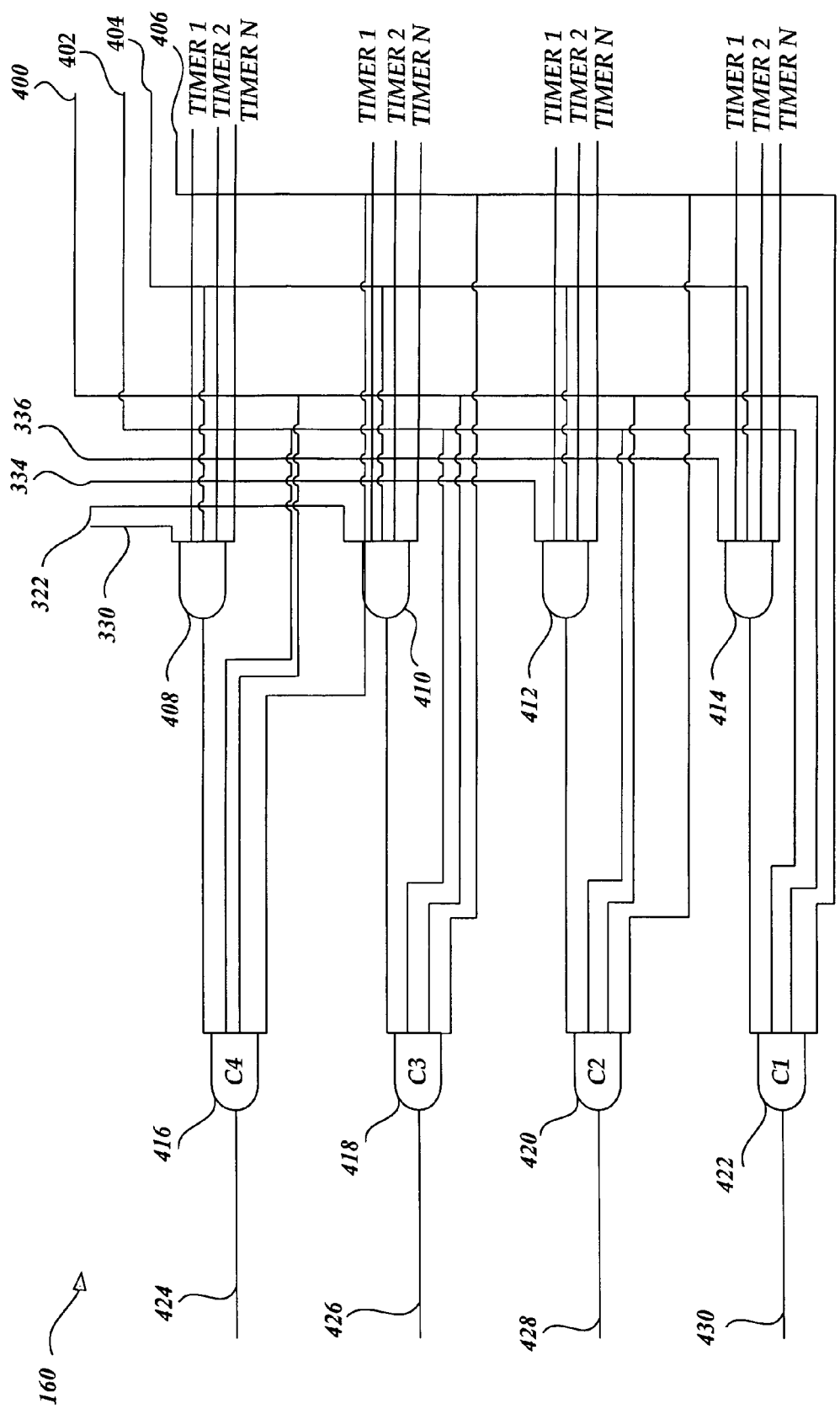
FIG. 4 is a block diagram of exemplary design logic for aggregating signals that originate from different sources so that the CPU may be transitioned into an appropriate reduced power state.

Now with reference to FIG. 4, the timer aggregator component 160 will be described in more detail. As mentioned previously, at block 206, signals that originate from a plurality of sources are processed. In one embodiment, the timer aggregator component 160 is responsible for aggregating the information represented in the various incoming signals. In this regard and as illustrated in FIG. 4, a set of incoming signals are input into the timer aggregator component 160 that describe the processing state of the CPU including a power state transition signal 400, an interrupt processing signal 402, an asynchronous events signal 404, and a request completion signal 406. Moreover, as further illustrated in FIG. 4, the timer aggregator component 160 includes a preliminary set of "AND" comparators 408-414 and a terminating set of "AND" comparators 416-422.

In one embodiment, input signals into the preliminary set of "AND" comparators 408-414 originate from different timers. For example, the output signals 330-336 described above with reference to FIG. 3 are input from a first timer ("TIMER 0"). Additional signals are also input into the preliminary set of "AND" comparators 408-414 which originate from other timers ("TIMER 1," TIMER 2," ... "TIMER N") that may generate events which initiate processing by a CPU. Each of the preliminary "AND" comparators 408-414 performs a comparison to determine whether all of their associated input signals are "true." In instances when all of the input signals are "true," the output produced is also "true."

As illustrated in FIG. 4, an input into each of the preliminary set of "AND" comparators 408-414 is an asynchronous event signal 404. Those skilled in the art and others will recognize that, depending on the architecture of the computer platform, other types of mechanisms may generate events in order to initiate processing by a CPU other than timers. The asynchronous events signal 404 may be used by developers to identify instances when an asynchronous event requiring CPU attention will occur. For example, if an asynchronous event that will cause a CPU to perform processing is scheduled, the value of the asynchronous events signal 404 may be set to "false." As a result, each of the preliminary set of "AND" comparators 408-414 receives the "false" signal, thereby preventing the CPU from transitioning into a reduced power state.

As illustrated in FIG. 4, each terminating set of "AND" comparators 416-422 receives input from the power state transition signal 400, an associated preliminary "AND" comparator 408-414, an interrupt processing signal 402, and a request completion signal 406. Similar to the description provided above, the terminating "AND" comparators 416-422 perform a comparison to determine whether all of their associated input signals are "true." If all of the input signals into a particular "AND" comparator are "true," then the output signal from the comparator is also "true." The signals transmitted on the output signals 424-430 are forwarded to a transition engine that is responsible for transitioning the CPU into the deepest appropriate reduced power state.

As illustrated in FIG. 4, inputs into each of the terminating set of "AND" comparators 416-422 also include a power state transition signal 400, an interrupt processing signal 402, and a request completion signal 406. A "true" value may be generated on the power state transition signal 400 any time the CPU issues a request to transition into a reduced power state. In contrast, "false" values may be generated on the interrupt processing signal 402 or the request completion signal 406 to prevent the CPU from transitioning into a reduced power state. In this regard, those skilled in the art and others will recognize that modern computers support interrupts in which a process that currently has access to a CPU may be interrupted so that other program code may execute. In instances when an interrupt identified as proceeding through an interrupt controller, the interrupt processing signal 402 may be set to "false." Similarly, if the completion of an operation, such as a fetch request, is imminent, the request completion signal 406 may be set to "false" to prevent the CPU from transitioning into a reduced power state.

Returning to the method 200 described with reference to FIG. 2, when the timer aggregator component 160 generates output, the CPU may transition into a reduced power state. For illustrative purposes, at block 208, the CPU transitions into the C4 reduced power state in response to the appropriate signals being generated by the timer aggregator component 160. Since performing a transition into a reduced power state may be completed using techniques that are generally known on the art, those techniques will not be described in detail here.

At decision block 210, the method 200 determines whether the process of recovering the CPU from a reduced power state will be initiated. Aspects of the present invention implement functionality for seamlessly recovering from a reduced power state in a way that does not impact system performance. As mentioned previously, a certain amount of latency is associated with recovering from a reduced power state. As events that require CPU attention approach, logic implemented by the recovery component 165 determine whether the process of recovering from a reduced power state should be initiated so that the CPU will be ready to execute instructions when an event requiring CPU attention is generated.

Figure 5:
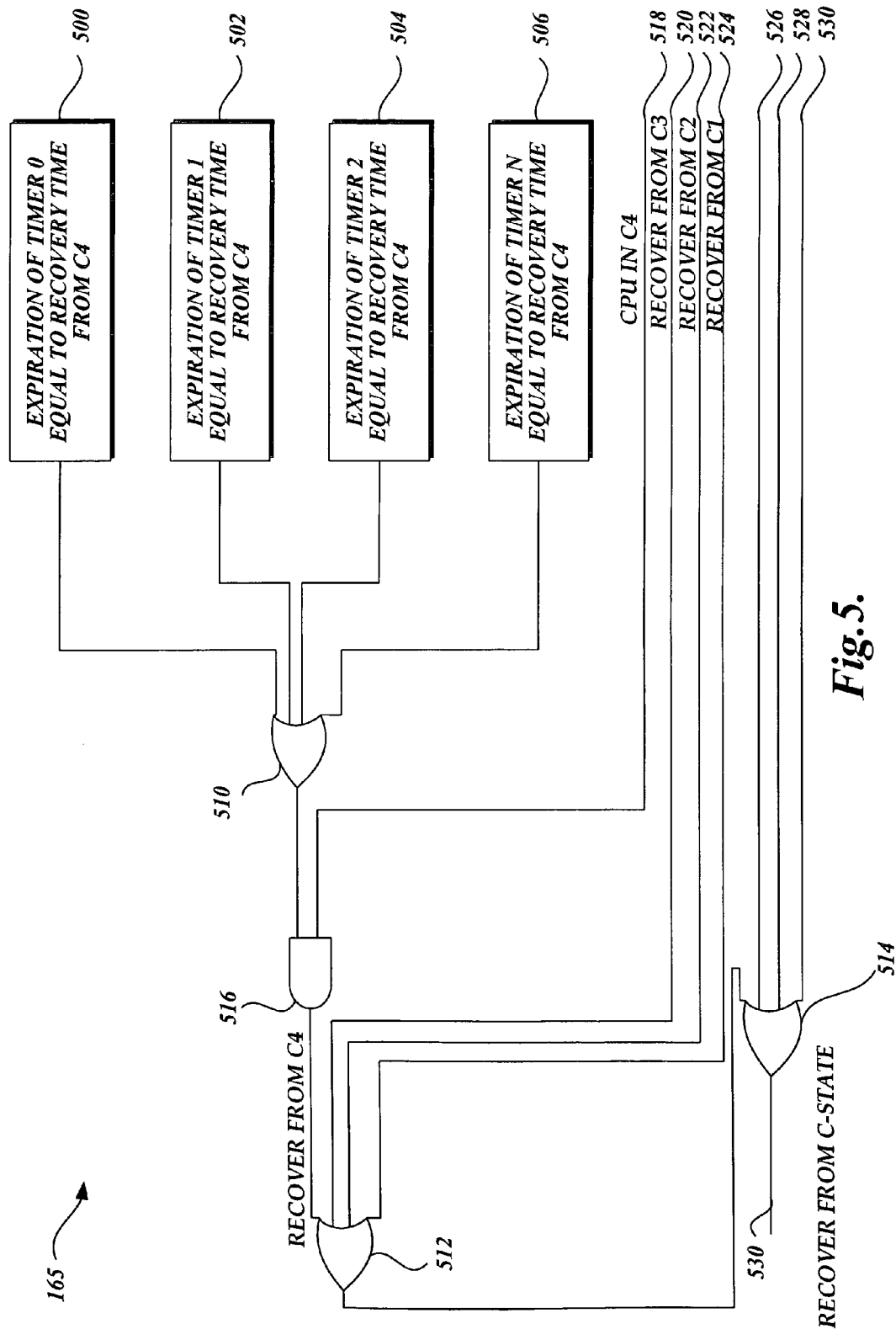
FIG. 5 is a block diagram of exemplary design logic that enables a computer to seamlessly recover from a reduced or power state without impacting system performance.

Now with reference to FIG. 5, the recovery component 165 mentioned briefly above will be described in more detail. As mentioned previously, at block 210 (FIG. 2), a determination is made regarding whether the process of recovering the CPU from a reduced power state will be initiated. The logic implemented in the recovery component 165 is capable of making this determination so that the CPU may be transitioned back into the working state before instructions are ready to be executed. In this regard and as illustrated in FIG. 5, the recovery component 165 includes the discrete elements of comparator logic 500-506, the "OR" comparators 510-514, the "AND" comparator 516, the state signals 518-524, the interrupt processing signal 526, the request completion signal 528, and the other wake events signal 530.

Each discrete element of comparator logic 500-506 performs a comparison of the time remaining before a timer expires with the recovery time associated with returning from a particular reduced power state. For example, in the example illustrated in FIG. 5, the discrete element of comparator logic 500 compares the recovery time of returning from the C4 reduced power state with the time remaining before a first timer ("TIMER 0") expires. In a similar fashion, the other discrete elements of comparator logic 502-506 compare the recovery time of returning from the C4 reduced power state with the time remaining before other timers ("TIMER 1," TIMER 2," ... "TIMER N") will expire. If the time remaining before any one of the timers is equal to the time required to recover from the C4 reduced power state, the output originating from the comparator logic 500-506 will be "true." Moreover, when the state signal 518 is "true" indicating that the CPU is in the C4 reduced power state, the "OR" comparators 512 and 514 will eventually generate a signal on the output signal 530 that indicates the CPU will recover from the C4 reduced power state. This signal is received by a transition engine that is responsible for transitioning the CPU from a particular reduced power state into the working state.

In addition to the CPU being transitioned out of a reduced power state as a result of the countdown of a timer matching a particular recovery time, the recovery component 165 may cause the CPU to recover from a reduced power state in other instances. For example, when a "true" value is received on the incoming state signals 520-524, the "OR" comparators 512 and 514 will generate a "true" output on the output signal 530. In one embodiment, input from the incoming state signals 520-524 may be received when a determination is made that CPU will transition out of a reduced power state (e.g., C0-C3) that isn't as deep as the current reduced power state (e.g., C4). By way of another example, input may be received on the interrupt processing signal 526, the request completion signal 528, or the other wake events signal 530 that cause the CPU to transition out of the current reduced power state. Similar to the description provided above with reference to FIG. 4, each of the signals 526-530 may be used to indicate that processing is imminent and the CPU should be transitioned into the working state.

As mentioned previously, at block 210, the method 200 remains idle until a determination is made that the CPU will transition from a reduced power state into the working state. In this regard, the recovery component 165 may process various incoming signals for the purpose of identifying when the transition out of the reduced power state will be performed. Then, the method 200 proceeds to block 212 where the transition from the reduced power state into the working state is completed. Since completing the transition, at block 212, may be performed using technique that are generally known in the art, those techniques will not be described in detail here. Then the method 200 proceeds to block 214 where terminates.

While illustrative embodiments have been illustrated and described, it will be appreciated that various changes can be made therein without departing from the spirit and scope of the invention.

The invention claimed is:

1. In a computer with a CPU capable of entering one or more reduced power states, a method of transitioning the CPU into a reduced power state in response to a fetch operation being dispatched to an I/O device, the method comprising:
    (a) comparing the latency associated with recovering from a reduced power state with the time remaining before a first timer expires;
    (b) generating a signal originating from the first timer that identifies the reduced power state that the CPU may enter before the first timer expires;
    (c) aggregating signals that originate from a plurality of timers to identify a reduced power state that the CPU may enter before any of the plurality of timers expire; and
    (d) transitioning the CPU into a reduced power state based on the signals received from the plurality of timers.

2. The method as recited in claim 1, further comprising transitioning the CPU back from the reduced power state to the working state before instructions are ready to be executed.

3. The method as recited in claim 2, wherein transitioning the CPU back from the reduced power state to the working state before instructions are ready to be executed includes:
    (a) comparing the time remaining before the first timer expires with the recovery time associated with returning from the reduced power state;
    (b) aggregating signals that originate from a plurality of timers; and
    (c) determining whether the time remaining before any of the plurality of expires matches the latency associated with returning from the reduced power state.

4. The method as recited in claim 1, wherein comparing the latency associated with recovering from a reduced power state with the time remaining before a first timer expires includes using a hardware-based comparator that compares inputs to produce an output that characterizes a relationship between the inputs.

5. The method as recited in claim 1, wherein the identity of the reduced power state that the CPU is transitioned into depends on the length of time before the fetch operation is satisfied.

6. The method as recited in claim 1, wherein the reduced power state that CPU is transitioned into is a reduced power C-state.

7. The method as recited in claim 1, wherein the reduced power state that CPU is transitioned into is a reduced power P-state.

8. The method as recited in claim 1, wherein aggregating signals that originate from a plurality of timers to identify a reduced power state includes:
    (a) determining whether latency associated with transitioning from the reduced power state is greater than the time required to satisfy the fetch operation; and
    (b) if the latency associated with transitioning from the reduced power state is greater than the time required to satisfy the fetch operation, keeping the CPU in the working state.

9. The method as recited in claim 1, wherein aggregating signals that originate from a plurality of timers to identify a reduced power state includes:
    (a) identifying when an asynchronous event that requires the CPU is scheduled to occur;
    (b) if an asynchronous event that requires the CPU is scheduled, keeping the CPU in the working state.

10. The method as recited in claim 1, wherein aggregating signals that originate from a plurality of timers to identify a reduced power state includes:
    (a) identifying when an interrupt is proceeding through an interrupt controller; and
    (b) if an interrupt is identified as proceeding through the interrupt controller, keeping the CPU in the working state.

11. The method as recited in claim 1, wherein aggregating signals that originate from a plurality of timers to identify a reduced power state includes:
    (a) identifying when a completion to a fetch operation is imminent; and
    (b) if a completion to a fetch operation is imminent, keeping the CPU in the working state.

12. The method as recited in claim 1, wherein transitioning the CPU into a reduced power state based on the signals received from the plurality of timers includes forwarding a signal to a transition engine that identifies the deepest appropriate reduced power state for the CPU given the processing that will be performed on the computer.

13. In a computer with a CPU capable of entering one or more reduced power states, a method of recovering from a reduced power state before instructions are ready to be executed, the method comprising:
    (a) performing a comparison of the time remaining before a first timer expires with the recovery time associated with returning from the reduced power state;
    (b) generating a signal from the first timer that identifies whether the time remaining before expiration of the first timer matches the recovery time associated with returning from the reduced power state;
    (c) aggregating signals that originate from a plurality of timers;
    (d) if the time to recover from the reduced power state matches the time remaining before any of the plurality of timers expires, causing the CPU to transition into the working state.

14. The method as recited in claim 13, wherein performing a comparison of the time remaining before the first timer expires with the recovery time associated with returning from the reduced power state includes using a hardware-based comparator to produce an output that characterizes a relationship between inputs.

15. The method as recited in claim 13, wherein causing the CPU to transition to the working state includes forwarding a signal to a transition engine.

16. The method as recited in claim 13, wherein aggregating signals that originate from a plurality of timers includes identifying when processing by the CPU is imminent.

17. The method as recited in claim 16, wherein processing is identified as being imminent when a signal characteristic of an interrupt is identified as proceeding through an interrupt controller.

18. The method as recited in claim 16, wherein processing is identified as being imminent when a determination is made that CPU will transition out of a reduced power state that is not as deep as the current reduced power state.

19. A CPU capable of being transitioned into a plurality of power states whose types and power consumptions are different, having components that enable a transition into a deepest appropriate reduced power state, including:

(a) a timer specific component for performing a comparison of the time remaining before a first timer expires with the recovery time associated with returning from the deepest appropriate reduced power state;

(b) a timer aggregator component configured to:
  (i) receive signals originating from a plurality of timers; and
  (ii) process the incoming signals to identify the deepest appropriate reduced power state given the processing that will be performed by the CPU;
  (iii) forward a signal to a transition engine that identifies the deepest appropriate reduced power state; and (c) a transition engine operative to transition the CPU into the deepest appropriate reduced power state identified by the timer aggregator component.

20. The CPU as recited in claim 19, further comprising a recovery component configured to transition the CPU back into the working state before instructions are ready to be executed.

* * * * *